UNITED STATES PATENT OFFICE.

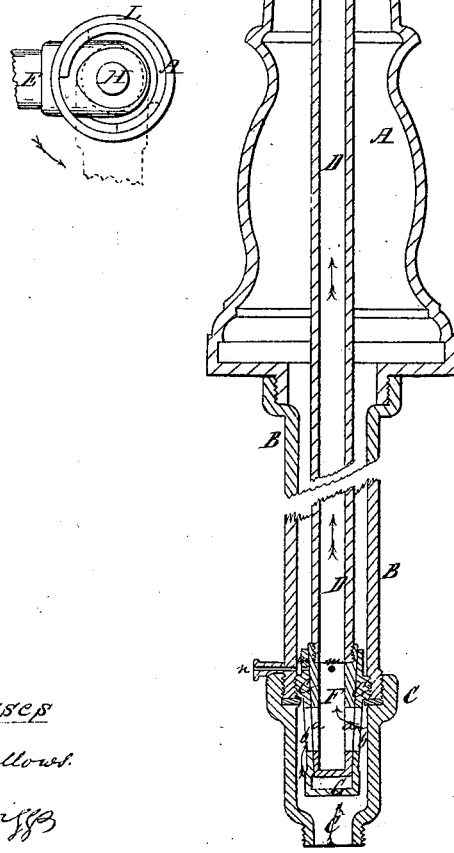

WASHBURN RACE AND S. R. C. MATHEWS, OF SENECA FALLS, NEW YORK.

HYDRANT.

Specification of Letters Patent No. 23,706, dated April 19, 1859.

*To all whom it may concern:*

Be it known that we, WASHBURN RACE and S. R. C. MATHEWS, of Seneca Falls, in the county of Seneca and State of New York, have invented a new and Improved Mode of Constructing Hydrants; and we do hereby declare that the following is a full and exact description thereof, reference being had to the accompanying drawings and to the letters of reference marked thereon, Figure 1 being a vertical section thereof and Fig. 2, a plan view of the top with the cap K removed.

Similar letters refer to corresponding parts in each of the figures.

The stock A, is attached by means of a screw to the external pipe B, which connects in the same manner with the main or water pipe C. The conducting pipe D is attached to the nozzle E turning with it, its lower end terminating with a conical tubular valve F, closed at the bottom, but having openings $a$ $a$ on its sides for the admission of the water. This valve is fitted into the conical shell or seat G, which is screwed into the inclosing tube B, and being closed at its lower end $c$ does not admit the water into B, and only into the tube D, when the valve is so turned that its openings $a$ coincide with those $b$ $b$ of the seat. This opening and closing is effected by turning the nozzle E, a quarter of a revolution.

A stem H, from the nozzle rises directly in a line with the pipe D, and enters a socket or tubular portion of the cap K, which is removable from the stock, being secured by a screw. A piece of india rubber or other suitably elastic material $j$ is inserted in the socket where it bears on the stem H, and secures sufficient and uniform pressure of the valve F, on its seat. This elastic pressure compensates for any wear whereby the valve might become loose and liable to leak, and maintains a light but steady bearing which causes it to work equally well at all times.

The large opening in the side of the stock necessary for the admission of the nozzle to the position it occupies, as well as to accommodate the movement by which it opens and closes the valve, is concealed by the broad ring L, having only a side opening through which the nozzle passes. It rests on a flange $d$ and fits against the stock only at the upper and lower edges to reduce friction as it turns with the nozzle.

The cap K, covers the upper joint without bearing directly on it, a little space being left to allow it to move readily, as there is also in the hole through which the nozzle passes to admit of the slight action of the spring $j$. This entirely excludes dust and dirt from entering within the stock or outer tube.

A drip orifice $m$ is provided in the valve F, and its seat, so arranged that the two shall coincide only when the valve is closed so that no waste of water occurs. At such times the water from pipe D, escapes into the inclosing pipe B, whence it is conducted off by the small tube $n$, to which a pipe may be connected if thought necessary.

The seat G, is made closed at the bottom to prevent the pressure of the water from being received by the valve, which would derange the permanent action of the spring $j$, and require one of greater power to be used. By thus shielding the valve from the external pressure of the water it works with much greater ease as it is less liable to wear.

The valve can readily be taken up if necessary by simply removing the cap K, when it is easily drawn out by raising the nozzle and pipe.

The construction throughout is exceedingly simple, and not at all liable to get out of repair.

What we claim as our invention and desire to secure by Letters Patent is—

The combination and arrangement of the parts herein described, consisting of the cap K, having within its socket the spring $j$ or its equivalent, stem attachment H, interior tube D, conical valve F, and closed seat G, whereby the valve is kept in place by the force of the spring $j$ and operated free from the external pressure of the water substantially as and for the purpose set forth.

WASHBURN RACE.
S. R. C. MATHEWS.

Witnesses:
M. L. BELLOWS,
C. G. BRIGGS.